United States Patent
Tamhankar et al.

(10) Patent No.: US 7,544,342 B2
(45) Date of Patent: Jun. 9, 2009

(54) HYDROGEN PRODUCTION PROCESS

(75) Inventors: Satish S. Tamhankar, Scotch Plains, NJ (US); Sekharipuram V. Krishnan, Bridgewater, NJ (US); Michael H. Leison, Macungie, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 662 days.

(21) Appl. No.: 11/145,835

(22) Filed: Jun. 6, 2005

(65) Prior Publication Data

US 2006/0045844 A1    Mar. 2, 2006

Related U.S. Application Data

(60) Provisional application No. 60/604,285, filed on Aug. 25, 2004.

(51) Int. Cl.
*C01B 31/18* (2006.01)
*C01B 3/24* (2006.01)
*C01B 3/26* (2006.01)

(52) U.S. Cl. .................. 423/418.2; 423/650; 423/651

(58) Field of Classification Search .............. 423/650, 423/651, 418.2
See application file for complete search history.

(56) References Cited

U.S. PATENT DOCUMENTS

| | | |
|---|---|---|
| 3,129,060 A | 4/1964 | Pohlenz |
| 3,342,561 A | 9/1967 | Pohlenz et al. |
| 3,355,248 A | 11/1967 | Hayes |
| 3,928,973 A | 12/1975 | Hand |
| 4,244,810 A | 1/1981 | Youngblood et al. |
| 4,522,894 A | 6/1985 | Hwang et al. |
| 4,788,004 A | 11/1988 | Pinto et al. |
| 4,844,837 A | 7/1989 | Heck et al. |
| 4,938,685 A | 7/1990 | Noakes et al. |
| 4,969,931 A | 11/1990 | Wu et al. |
| 5,106,590 A | 4/1992 | Hopper et al. |
| 5,110,563 A | 5/1992 | Noakes et al. |
| 5,149,464 A | 9/1992 | Green et al. |
| 5,198,084 A | 3/1993 | Cha et al. |
| 5,246,791 A | 9/1993 | Fisher et al. |
| 5,486,313 A | 1/1996 | De Jong et al. |
| 5,510,056 A | 4/1996 | Jacobs et al. |

(Continued)

FOREIGN PATENT DOCUMENTS

EP    0 442 164 A1    8/1991

(Continued)

OTHER PUBLICATIONS

Communication from the European Patent Office including Search Report dated Dec. 21, 2005 (with Annex).

(Continued)

*Primary Examiner*—Wayne Langel
(74) *Attorney, Agent, or Firm*—Philip H. Von Neida

(57) ABSTRACT

The present invention provides a process for producing hydrogen by passing a hydrocarbon-containing gas over a ceramic monolith at a temperature sufficient to produce hydrogen; and passing an oxygen-containing gas over the ceramic monolith at a temperature sufficient to react with the carbon on the ceramic monolith and to produce carbon monoxide. The process is performed cyclically using one or more beds in a manner such that hydrogen is produced followed by carbon monoxide production.

52 Claims, 2 Drawing Sheets

U.S. PATENT DOCUMENTS

| | | | |
|---|---|---|---|
| 5,560,900 | A | 10/1996 | Gbordzoe et al. |
| 6,506,510 | B1 | 1/2003 | Sioui et al. |
| 6,540,975 | B2 * | 4/2003 | Tonkovich et al. .......... 423/659 |
| 2003/0031901 | A1 | 2/2003 | Breuer et al. |

FOREIGN PATENT DOCUMENTS

| | | |
|---|---|---|
| EP | 0 537 862 A1 | 4/1993 |
| EP | 0 553 924 A1 | 8/1993 |
| EP | 0 576 096 A2 | 12/1993 |
| EP | 0 640 561 A1 | 3/1995 |
| EP | 0 645 344 A1 | 3/1995 |
| EP | 0 656 317 A1 | 6/1995 |
| EP | 0 967 174 | 12/1999 |
| FR | 2 831 880 | 5/2003 |
| GB | 2 275 480 | 8/1994 |

OTHER PUBLICATIONS

Nazim Z. Muradov, Florida Solar Energy Center, Task 4 Report, "Production of Hydrogen by Thermocatalytic Cracking of Natural Gas," Annual Report, Oct. 1995, pp. 81-103.

S.T. Ceyer, Q.Y. Yang, M.B. Lee, J.D. Beckerle, A.D. Johnson, "The Mechanism for the Dissociation of Methane on a Nickel Catalyst," Methane Coversion, 1988 Elsevier Science Publishers B.V., Amsterdam, pp. 51-66.

N. Muradov, Florida Solar Energy Center, "Thermocatalytic $CO_2$-Free Production of Hydrogen from Hydrocarbon Fuels," Proceedings of the 2002 U.S. DOE Hydrogen Program Review NREL/CP-610-32405, pp. 1-19.

M. G. Poirier, C. Sapundzhiev, "Catalytic Decomposition of Natural Gas to Hydrogen for Fuel Cell Applications," Int. J. Hydrogen Energy, vol. 22, No. 4, pp. 429-433, 1997.

M.I. Levinbuk, N.Y. Usachev, "The Production of Hydrogen Through Methane Conversion Over Reagent Catalysts. An Evaluation of the Feasibility of Catalytic Cracking Unit Utilization for Methane Conversion," Natural Gas Conversion V, Studies in Surface Science and Catalysis, vol. 119, pp. 391-396, (1998).

Meyer Steinberg, "Production of Hydrogen and Methanol from Natural Gas with Reduced $CO_2$ Emission," Int. J. Hydrogen Energy, vol. 23, No. 6, pp. 419-245, 1998.

P. M. Torniainen, X. Chu, L. D. Schmidt, "Comparison of Monolith-Supported Metals for the Direct Oxidation of Methane to Syngas," Journal of Catalysis 146, 1-10, 1994.

* cited by examiner

HYDROGEN PRODUCTION PROCESS

The present application claims priority from U.S. Provisional Patent Application Ser. No. 60/604,285, filed Aug. 25, 2004.

BACKGROUND OF THE INVENTION

The conversion of hydrocarbons to hydrogen and carbon monoxide containing gases is well known in the art. Examples of such processes include catalytic steam reforming, auto-thermal catalytic reforming, catalytic partial oxidation and non-catalytic partial oxidation. Each of these processes has advantages and disadvantages and produces various ratios of hydrogen and carbon monoxide, also known as synthesis gas. The present invention is directed to a hydrocarbon cracking process for producing hydrogen or a methane-hydrogen mixture through the use of a monolith based catalyst. The present invention is also directed towards the production of synthesis gas from a single unit reactor.

Partial oxidation processes are also well known and the art is replete with various catalytic partial oxidation processes. Partial oxidation is an exothermic reaction wherein a hydrocarbon gas, such as methane, and an oxygen-containing gas, such as air, is contacted with a catalyst at elevated temperatures to produce a reaction product containing high concentrations of hydrogen and carbon monoxide. The catalysts used in these processes are typically noble metals, such as platinum or rhodium, and other transition metals, such as nickel on a suitable support.

Partial oxidation processes convert hydrocarbon-containing gases, such as natural gas, to hydrogen, carbon monoxide and other trace components such as carbon dioxide and water. The process is typically carried out by injecting preheated hydrocarbons and an oxygen-containing gas into a combustion chamber where oxidation of the hydrocarbons occurs with less than stoichiometric amounts of oxygen for incomplete combustion. This reaction is conducted at very high temperatures, such as in excess of 700° C. and often in excess of 1,000° C., and pressures up to 150 atmospheres. In some reactions, steam or carbon dioxide can also be injected into the combustion chamber to modify the synthesis gas product and to adjust the ratio of hydrogen to carbon monoxide.

More recently, partial oxidation processes have been disclosed in which the hydrocarbon gas is contacted with the oxygen-containing gas at high space velocities in the presence of a catalyst such as a metal deposited on a ceramic foam (monolith) support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like. During operation of these reactions, the hydrocarbon feed gases and oxygen-containing gases are initially contacted with the metal catalyst at temperatures in excess of 400° C., typically in excess of 600° C., and at a standard gas hourly space velocity (GHSV) of over 100,000 per hour.

However, these processes still require downstream separation to obtain hydrogen and/or carbon monoxide as separate products. In the hydrocarbon cracking process of this invention, hydrogen and carbon monoxide are separately produced directly in a single reactor by operating in a cyclic fashion.

Earlier methods for producing hydrogen from hydrocarbon decomposition suffer from excessive pressure drop in fixed bed operations or operational complexity in circulating fluid beds. The present method will provide a solution to these problems as the ceramic monolith has a high porosity with large pore size and will cause negligible pressure drop during operation. Further, there is no movement of the catalyst and the resulting attrition, plugging or other problems associated with circulating fluid beds. In addition, earlier methods focused upon the products being either only hydrogen (M. Poirier and C. Sapundzhiev) or hydrogen and carbon products (N. Muradov). The present method will enable the generation of pure CO selectively over $CO_2$ by tuning the operation parameters of regeneration oxygen containing stream and CO can be collected continuously; thus upgrading the value of products significantly.

SUMMARY OF THE INVENTION

The present invention provides for a process for producing hydrogen and carbon monoxide comprising the steps:

a) passing a hydrocarbon-containing gas over a ceramic monolith at a temperature sufficient to produce hydrogen; and b) passing an oxygen-containing gas over the ceramic monolith at a temperature sufficient to react with the carbon on the ceramic monolith and to produce carbon monoxide.

The process of the present invention is preferably carried out cyclically. The flows of the gases will alternate between at least two reactors to obtain a continuous flow of product. Between the steps, the reactor containing the ceramic monolith is briefly purged with an inert gas, such as nitrogen, so that flammable mixtures will not form.

In alternative embodiments of the present invention, the carbon monoxide can be captured as a second product or can be fed to a shift reactor to produce more hydrogen.

In another embodiment of the invention, the regeneration conditions can be adjusted to obtain carbon dioxide as the only product by completely oxidizing the carbon deposited on the catalyst surface.

In a further embodiment of the present invention, the feed flow rates of the gas and operating temperature of the ceramic monolith are controlled to obtain a product gas mixture that primarily comprises methane and about 20 to 30% by volume hydrogen.

DETAILED DESCRIPTION OF THE INVENTION

Figure 1:
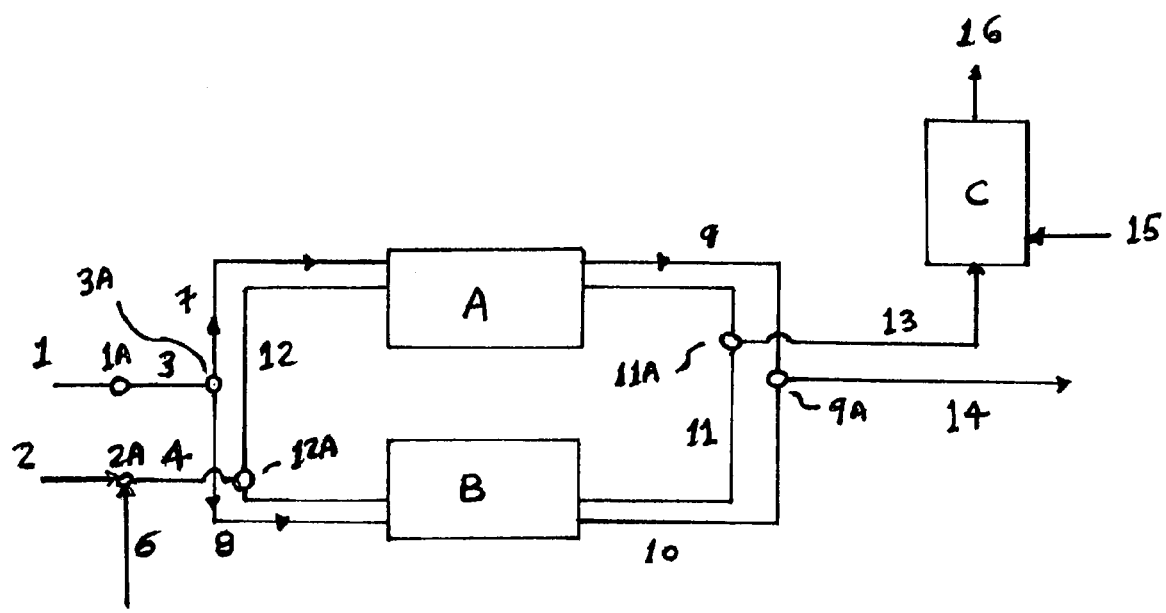
FIG. 1 is a schematic representation of a two-bed, monolith reactor system to produce hydrogen and optionally carbon monoxide.

Hydrogen is produced by the process of the present invention by first passing a hydrocarbon-containing gas stream such as methane into a reactor containing a ceramic monolith which is impregnated with a catalyst. The hydrocarbon is passed over the ceramic monolith at a pressure ranging from about 1 bar to about 30 bar.

In the second step of the process, an oxygen-containing gas, such as air, oxygen-enriched air or pure oxygen or a mixture of oxygen and steam, is passed into the reactor and reacts with the carbon deposited primarily as coke on the ceramic monolith. The operating conditions are tuned such that this will form carbon monoxide, which can be captured as a product or directed to a shift gas reactor to further produce more hydrogen.

Between these two steps, an inert gas, which is selected from the group consisting of nitrogen, argon, helium or steam is introduced into the reactor chamber to purge out the chamber. The inert gas is preferably steam. This will inhibit the formation of flammable mixtures of gas during the entire process and steam can be separated from the product gas of hydrogen and carbon monoxide by condensation relatively easily. The first step in the process or cracking step is endothermic while the second step of coke burning is exothermic. The heat produced in the second step will be stored in the ceramic monolith body or other forms of thermal mass such as chemical porcelain in the reactors and employed in the first step of the process.

The hydrocarbon-containing gas may be any gaseous or vaporizable liquid hydrocarbon either by itself or in combination with other hydrocarbon-containing gases. Preferably, the hydrocarbon-containing gas is selected from the group consisting of ethane, propane, butane, benzene, or mixtures thereof.

The gas flow rates for production of hydrogen and carbon monoxide range from about 690 $hr^{-1}$ to about 1380 $hr^{-1}$ for the hydrocarbon-containing gas and from about 1725 $hr^{-1}$ to about 3450 $hr^{-1}$ when air is employed in the second step. When oxygen is employed the gas flow rate is about 345 $hr^{-1}$ to about 690 $hr^{-1}$.

The temperatures at which the first step and the second step are performed are about 700° to about 900° C. for the cracking or first step. The second step will take place at roughly the same temperatures.

The hydrocarbon-containing gas is preferably fed at a temperature greater than 500° C. and more preferably at a temperature greater than about 500° C.

The oxygen-containing gas is preferably fed at a temperature greater than about 25° C. and more preferably at a temperature greater than about 100° C. with the addition of steam.

In a further alternative embodiment of the present invention, the operating conditions of the reactor during the first step are controlled in a manner to yield a mixture which comprises methane and hydrogen. The feed flow rates of the hydrocarbon-containing gas and the operating temperatures of the reactor chamber are controlled so as to produce a methane and hydrogen gas mixture, which contains about 20 to 30% by volume hydrogen. This mixture can be employed as a fuel in automotive engines and other internal combustion devices, particularly to reduce the formation of nitrogen oxides ($NO_x$) and other emissions and will improve the efficiency of the engine. This "tuning" of the reactor system can result in a product gas that contains a controlled amount of hydrogen ranging from about 20% to about 100% by volume, which can then be utilized in a variety of industrial applications. Studies run at 850° C. and at 5 psig resulted in a gas mixture of 35% methane and 58% hydrogen.

Regeneration conditions can also be adjusted to obtain all carbon dioxide as the product. This again involves tuning the reaction conditions such that the amount of oxygen-containing gas such as air, oxygen-enriched air, pure oxygen or mixture of oxygen and steam is adjusted as it is introduced into the second step of the reaction. By introducing a stoichiometric amount or greater than stoichiometric amount of the oxygen-containing gas to make the environment oxygen-rich, then carbon dioxide, rather than carbon monoxide is obtained.

The metal catalysts employed in the present invention consist of a ceramic monolith support structure composed of alumina substrate and impregnated with a transition metal such as Fe, Ni and Pd or combinations thereof. As used herein, "metal catalyst" refers to the entire catalyst structure including the metal and the monolith support. The monolith support is generally a ceramic foam-like structure formed from a single structural unit wherein the passages are disposed in either an irregular or regular pattern with spacing between adjacent passages. The single structural unit is used in place of conventional particulate or granular catalysts, which are less desirable in the present process. Examples of such irregularly patterned monolith supports include filters used for molten metals. Examples of regularly patterned supports include monolith honeycomb supports used for purifying exhausts from motor vehicles and used in various chemical processes. Preferred are the ceramic foam structures having irregular passages. Both types of monolith supports are known and are commercially available.

The catalyst element consists of a ceramic foam monolith composed substantially of alumina and containing about 0.5 to about 5 wt. % transition metal, preferably iron, nickel or palladium in metallic form or mixtures thereof. Optionally, iron at about 2 to about 5 wt. % may be used by itself or in combination with other metals. The reactor contains several ceramic foam disks including those with catalyst impregnated on them and the remaining blanks to fill the void space. The blank disks can be made of alumina, zirconia, cordierite or mixtures thereof. The impregnated metal, synergistically with alumina, acts as a catalyst for the cracking process. The disks with catalyst have porosity in the range 40 to 70 pores per inch (ppi) to maximize catalyst loading. Blank disks have a relatively high porosity 20 to 40 ppi in order to keep the pressure drop low.

Turning now to the figures, FIG. 1 is a schematic representation of a two-bed reactor system for carrying out the present invention. Line 1 carries the hydrocarbon-containing gas through valve 1A and line 3 to valve 3A. The hydrocarbon-containing gas continues through line 7 to first ceramic monolith bed A. Line 2 directs through valve 2A and line 4 to valve 12A the oxygen-containing gas which will enter ceramic monolith bed A after flow of the hydrocarbon-containing gas has stopped. In this embodiment, the two-beds system allows for the continuous production of hydrogen product and allows for the introduction of an inert gas such as nitrogen through line 5 and valve 2A through line 4 and valve 12A to enter either of ceramic monolith beds A or B between the introduction of hydrocarbon-containing gas and oxygen-containing gas through line 12.

After the hydrocarbon-containing gas has passed through ceramic monolith bed A, the hydrogen product will exit through line 9 and valve 9A to exit as product through line 14. As this is occurring, oxygen-containing gas will enter line 12 and enter ceramic monolith bed B where it will react with the carbon on the ceramic monolith and form carbon monoxide which exits ceramic monolith bed B through line 11 and valve 11A and through line 13. From here the carbon monoxide gas stream which may also contain some carbon dioxide will optionally enter the shift converter C while steam is entering through line 15. The product gas of the shift conversion will be hydrogen and carbon dioxide leaving though line 16.

When ceramic monolith bed B is being employed as the production reactor, hydrocarbon-containing gas is being directed from valve 3A to line 8 and into the ceramic monolith bed B where the reaction product hydrogen emerges through line 10 and out of the system as product through valve 9A and line 14. At the same time, the oxygen-containing gas will enter through line 4 and valve 12A line 12 and into the ceramic monolith bed A. There it will react with the carbon present on the ceramic monolith A and leave as carbon monoxide gas through line 11. Again, carbon dioxide may be present to some extent with the carbon monoxide and this mixture will exit through valve 11A and into line 13 for inclusion into the shift reactor.

It should be noted that if carbon monoxide/carbon dioxide is desired as an end product that it may be removed from line 13 without entry into the shift reactor.

Figure 2:
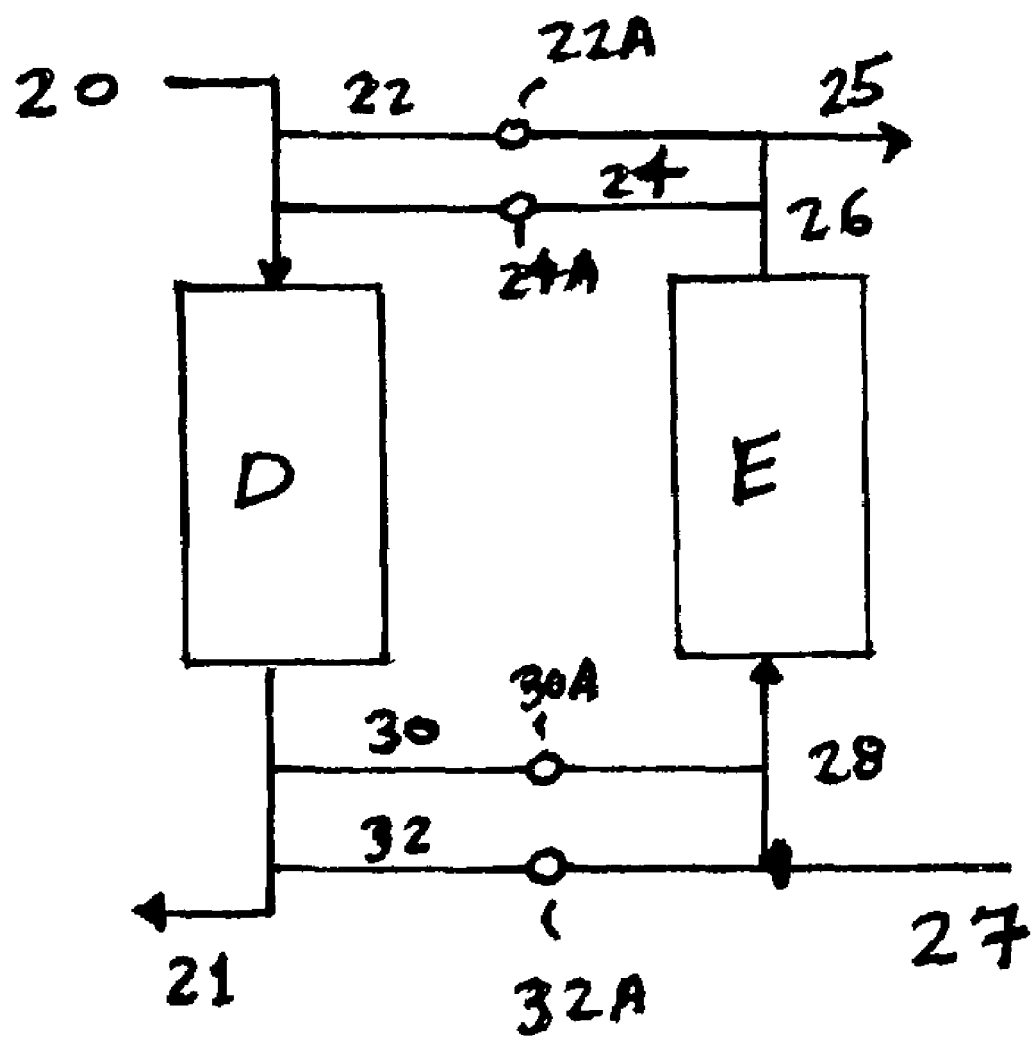
FIG. 2 is a schematic representation of a two-bed system for producing hydrogen.

FIG. 2 is a schematic representation of a two bed process for the production of hydrogen in a different configuration from that depicted in FIG. 1. The hydrocarbon-containing gas will enter ceramic monolith bed D which is a fixed bed ceramic monolith through line 20. The hydrocarbon-containing gas will react to form hydrogen in the bed and will exit through line 21 as product gas. In this situation valves 22A and 32A are closed. Oxygen-containing gas will enter through line 27 and line 28 into ceramic monolith bed E where it will react to form carbon monoxide and some carbon dioxide and exit through line 26 and out through line 25.

When ceramic monolith bed E is the production bed, hydrocarbon-containing gas is directed through line 20 and line 22 through valve 22A or line 24 and valve 24A to line 26 where the hydrocarbon-containing gas will react with the ceramic monolith in bed E. The hydrogen produced will exit ceramic monolith bed E through line 28 and line 32 through valve 32A or through line 30 and valve 30A and out as product gas through line 21. While this is occurring, oxygen-containing gas is directed through line 27 and through either line 30 and valve 30A or line 32 and valve 32A into line 21 where the oxygen-containing gas will enter ceramic monolith bed D. The oxygen-containing gas will react to form the carbon monoxide with some carbon dioxide gas and this will exit ceramic monolith bed D through line 20 and through either line 22 and valve 22A or line 24 and valve 24A into line 26 and out through line 25. Not shown but consistent with the present invention is that the carbon monoxide gas can be directed to a shift converter where it may be employed to produce more hydrogen.

EXAMPLES

Monolith Catalyst Preparation

Monoliths with an alumina washcoat and having 45 pores per inch (ppi) were obtained commercially and were 3 and 6 inches long with a 1.5 inch diameter. The 3 inch long monolith was soaked with water and then vacuum dried for 2 hours to note the increase in weight of the monolith. Solutions of iron, nickel and palladium were prepared by dissolving salts of Fe, Ni and Pd in water to provide 3 to 5 weight percent of the metal on the monolith.

After vacuum drying the soaked monolith in the prepared salt solution, it was calcined under nitrogen overnight at 800° C. and subsequently reduced in an atmosphere of 5% hydrogen in nitrogen for a similar duration. It should be noted that this reduction period was found to be somewhat inadequate for the testing because some amounts of iron oxide remained on the monolith after the reduction step.

Testing Procedure

The testing procedure used to test the process of the present invention was a two-step cyclic process. In the first step, methane was introduced into a furnace containing a catalyst that had been prepared by the methods described above through a pressure regulator and a series of valves, regulating the pressure and flow rate In the second step, air was introduced into the furnace in a counter-current fashion via pressure regulator and valves and the air flowrate was tuned to selectively favor the production of CO. A short purging step was required using nitrogen as the purging gas (the present inventors anticipate that steam may be used as well) between the thermal cracking (step I) and catalyst regeneration (step II) steps.

The furnace was operated at temperatures of 700° C., 800° C. and 900° C. Methane was directed through the furnace at a number of space velocities. Testing was performed on three different catalysts: 3.5% iron, 2% nickel, and 2% palladium.

The methane conversion to hydrogen gas was measured using formula (1) below and P is the observed concentration of hydrogen in the product gas leaving the furnace. The results of this testing are presented in tables 1a, 1b and 1c.

TABLE 1a

Maximum hydrogen concentration observed in product gas at 900° C.

| Space Velocity (h$^{-1}$) | Fe (3.5%) | Ni (2%) | Pd (2%) |
|---|---|---|---|
| 375 | 89 | 84.5 | 92.3 |
| 550 | 89 | | |
| 750 | 89 | 80 | 91.5 |
| 900 | 88.5 | | |
| 1100 | 86 | 82 | 90 |
| 2150 | | | 87 |

TABLE 1b

Maximum hydrogen concentration observed in product gas at 800° C.

| Space Velocity (h$^{-1}$) | Fe (3.5%) | Ni (2%) | Pd (2%) |
|---|---|---|---|
| 375 | 89 | 82 | 87 |
| 550 | 89 | | |
| 750 | 88 | 79 | 86 |
| 900 | | | |
| 1100 | 85 | 75 | 85 |

TABLE 1c

Maximum hydrogen concentration observed in product gas at 700° C.

| Space Velocity (h$^{-1}$) | Fe (3.5%) | Ni (2%) | Pd (2%) |
|---|---|---|---|
| 375 | 80 | 76 | 62 |
| 550 | 75 | | |
| 750 | 72 | 73 | 63 |
| 900 | | | |
| 1100 | 68 | 70 | 59 |

It should be noted that if X is the percentage conversion of methane to hydrogen, and if P is the observed concentration of hydrogen in the product gas as given in Tables 1a, 1b and 1c, then a rough approximation of X can be obtained using equation (1).

$$X = P/(200-P) \tag{1}$$

The results of this testing demonstrated that Fe and Pd catalyst were superior to Ni catalysts at 800° C. and 900° C. in terms of performance. It was also found that carbon monoxide is typically present in the product gas at about 2 to about 10% by volume in Step 1.

Further testing was performed as described above to determine the effects of higher catalyst loading. An iron salt solution higher in concentration than that used to produce the 3.5 weight percent catalyst was made by methods as described above. Iron loading of about 5 weight percent was achieved.

Tables 2a and 2b summarize the comparison between the 3.5 and 5 weight percent Fe monoliths in terms of maximum hydrogen concentration observed in the product gas. As used above, equation (1) provides an estimate of the methane conversion in each case.

TABLE 2a

Comparison of 3.5 and 5% weight Fe monoliths at 900° C.

| Space Velocity ($h^{-1}$) | 3.5% Fe Monolith | | 5% Fe Monolith | |
|---|---|---|---|---|
| | Max. % $H_2$ in product | Max. % $CH_4$ cracking | Max. % $H_2$ in product | Max. % $CH_4$ cracking |
| 375 | 89 | 80.2 | 92.3 | 85.5 |
| 550 | 89.2 | 80.5 | | |
| 750 | 89 | 80.2 | 93 | 87 |
| 900 | 88.5 | 80.0 | | |
| 1100 | 86 | 75.4 | 92 | 85.2 |
| 1700 | | | 88.8 | 80.0 |

TABLE 2b

Comparison of 3.5 and 5% weight Fe monoliths at 800 C.

| Space Velocity ($h^{-1}$) | 3.5% Fe Monolith | | 5% Fe Monolith | |
|---|---|---|---|---|
| | Max. % $H_2$ in product | Max. % $CH_4$ cracking | Max. % $H_2$ in product | Max. % $CH_4$ cracking |
| 375 | 89.4 | 80.6 | 90.1 | 82 |
| 550 | 88.8 | 80.1 | | |
| 750 | 87.7 | 78.1 | 89.7 | 81.3 |
| 1100 | 85.0 | 73.9 | | |
| 1700 | | | 81.2 | 68.4 |

Although the higher loading of Fe on the monolith catalyst increased methane cracking, these effects are best represented at 900° C.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A process for producing hydrogen and carbon monoxide comprising the steps:
   (a) passing a hydrocarbon-containing gas over a ceramic monolith at a temperature sufficient to crack said hydrocarbon-containing gas to produce hydrogen and to deposit carbon on said ceramic monolith; and
   (b) passing an oxygen-containing gas in a sub-stoichiometric ratio of oxygen to carbon over said ceramic monolith at a temperature sufficient to react oxygen with the carbon present on said ceramic monolith to produce carbon monoxide.

2. The process as claimed in claim 1 wherein said hydrocarbon containing gas is a gaseous or vaporizable liquid hydrocarbon, or mixtures thereof.

3. The process as claimed in claim 2 wherein said hydrocarbon-containing gas is selected from the group consisting of methane, ethane, propane, butane, benzene, and mixtures thereof.

4. The process as claimed in claim 1 wherein said hydrocarbon-containing gas is passed over said ceramic monolith at a pressure ranging from about 1 bar to about 30 bar.

5. The process as claimed in claim 1 wherein the temperature of said hydrocarbon-containing gas is greater than 300° C.

6. The process as claimed in claim 5 wherein the temperature of said hydrocarbon-containing gas is greater than 500° C.

7. The process as claimed in claim 1 wherein said oxygen-containing gas is selected from the group consisting of oxygen-enriched gas, oxygen, and air.

8. The process as claimed in claim 1 wherein said process is cyclical.

9. The process as claimed in claim 1 wherein said ceramic monolith is purged with an inert gas between steps (a) and (b).

10. The process as claimed in claim 9 wherein said inert gas is selected from the group consisting of nitrogen, argon, helium, steam and mixtures thereof.

11. The process as claimed in claim 1 wherein the heat generated by the reaction in step (b) is stored in said ceramic monolith.

12. The process as claimed in claim 11 wherein said stored heat is employed in step (a) of said process.

13. The process as claimed in claim 1 wherein said reaction yields a mixture of methane and hydrogen.

14. The process as claimed in claim 13 wherein about 20 to about 100% hydrogen is present in said mixture.

15. The process as claimed in claim 1 further comprising recovering said carbon monoxide and feeding to a shift reactor.

16. The process as claimed in claim 15 wherein said shift reactor produces additional hydrogen.

17. The process as claimed in claim 1 comprising completely oxidizing said carbon deposited on the surface of said ceramic monolith to form carbon dioxide by passing a gas containing oxygen in excess of stoichiometric.

18. The process as claimed in claim 1 wherein said ceramic monolith comprises a support coated with alumina and impregnated with a transition metal.

19. The process as claimed in claim 18 wherein said support is a ceramic foam-like structure.

20. The process as claimed in claim 19 wherein said ceramic foam-like structure has irregular or regular spacing.

21. The process as claimed in claim 18 wherein said transition metal is selected from the group consisting of iron, nickel, palladium and mixtures thereof.

22. The process as claimed in claim 21 wherein said transition metal is about 0.5 to about 5.0% by weight of said ceramic monolith.

23. The process as claimed in claim 1 wherein said ceramic monolith is in a reactor.

24. The process as claimed in claim 1 wherein said ceramic monolith is in the shape of a disc or a cylinder.

25. The process as claimed in claim 24 wherein more than one disc is present in said reactor.

26. The process as claimed in claim 25 wherein a spacer is present between said discs.

27. The process as claimed in claim 26 wherein more than one spacer is present in said reactor.

28. A cyclical process for producing hydrogen and carbon monoxide comprising the steps:
   (a) passing a hydrocarbon-containing gas over a first ceramic monolith in a first reactor at a temperature sufficient to crack said hydrocarbon-containing gas to produce and recover hydrogen and deposit carbon on said first ceramic monolith;
   (b) passing an oxygen-containing gas in a sub-stoichiometric ratio of oxygen to carbon over a second ceramic monolith in a second reactor at a temperature sufficient to react oxygen with carbon present on said second ceramic monolith to produce and recover carbon monoxide; and (c) alternating passing of said hydrocarbon-containing gas to said second reactor over said second ceramic monolith at a temperature sufficient to crack said hydrocarbon-containing gas to produce and recover hydrogen and deposit carbon on said second ceramic monolith; and (d) alternating passing of said oxygen-containing gas to said first reactor over said first ceramic monolith in a sub-stoichiometric ratio of oxygen to carbon and a temperature sufficient to react with carbon present on said first ceramic monolith to produce and recover carbon monoxide.

29. The process as claimed in claim 28 wherein said hydrocarbon containing gas is a gaseous or vaporizable liquid hydrocarbon, or mixtures thereof.

30. The process as claimed in claim 29 wherein said hydrocarbon-containing gas is selected from the group consisting of methane, ethane, propane, butane, benzene, and mixtures thereof.

31. The process as claimed in claim 28 wherein the temperature of said hydrocarbon-containing gas is at least greater than 300° C.

32. The process as claimed in claim 31 wherein the temperature of said hydrocarbon-containing gas is greater than 500° C.

33. The process as claimed in claim 28 wherein said hydrocarbon-containing gas is passed over said ceramic monolith at a pressure ranging from about 1 bar to about 30 bar.

34. The process as claimed in claim 28 wherein said oxygen-containing gas is selected from the group consisting of oxygen-enriched gas, oxygen, and air.

35. The process as claimed in claim 28 wherein more than one reactor containing said ceramic monolith is present in either step (a), step (b) or both step (a) and step (b).

36. The process as claimed in claim 28 wherein said ceramic monolith is purged with an inert gas between steps (a) and (b).

37. The process as claimed in claim 36 wherein said inert gas is selected from the group consisting of nitrogen, argon, helium, steam and mixtures thereof.

38. The process as claimed in claim 28 wherein the heat generated by the reaction is stored in said ceramic monolith.

39. The process as claimed in claim 38 wherein said stored heat is employed in step (a) of said process.

40. The process as claimed in claim 28 wherein said reaction yields a mixture of methane and hydrogen in step (a).

41. The process as claimed in claim 40 wherein about 20 to about 100% hydrogen is present in said mixture.

42. The process as claimed in claim 28 further comprising recovering said carbon monoxide and feeding to a shift reactor.

43. The process as claimed in claim 28 comprising completely oxidizing said carbon deposited on the surface of said catalyst to form carbon dioxide.

44. The process as claimed in claim 28 wherein said ceramic monolith comprises a support coated with alumina and impregnated with a transition metal.

45. The process as claimed in claim 44 wherein said support is a ceramic foam-like structure.

46. The process as claimed in claim 45 wherein said ceramic foam-like structure has irregular or regular spacing.

47. The process as claimed in claim 44 wherein said transition metal is selected from the group consisting of iron, nickel, palladium and mixtures thereof.

48. The process as claimed in claim 47 wherein said transition metal is about 0.5 to about 50% by weight of said ceramic monolith.

49. The process as claimed in claim 44 wherein said ceramic monolith is in the shape of a disc or a cylinder.

50. The process as claimed in claim 49 wherein more than one disc is present in said reactor.

51. The process as claimed in claim 50 wherein a spacer is present between said discs.

52. The process as claimed in claim 51 wherein more than one spacer is present in said reactor.

* * * * *